(12) United States Patent
Backhaus (10) Patent No.: US 11,834,978 B2
(45) Date of Patent: Dec. 5, 2023

(54) SYSTEMS AND METHODS FOR DECREASING TIME TO REACH LIGHT-OFF TEMPERATURE

(71) Applicant: CUMMINS EMISSION SOLUTIONS INC., Columbus, IN (US)

(72) Inventor: Jacob Backhaus, Stoughton, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/630,684

(22) PCT Filed: Jul. 30, 2019

(86) PCT No.: PCT/US2019/044101
§ 371 (c)(1),
(2) Date: Jan. 27, 2022

(87) PCT Pub. No.: WO2021/021127
PCT Pub. Date: Feb. 4, 2021

(65) Prior Publication Data
US 2022/0316380 A1    Oct. 6, 2022

(51) Int. Cl.
*F01N 3/20* (2006.01)
*F01N 13/00* (2010.01)
(Continued)

(52) U.S. Cl.
CPC ......... *F01N 3/2033* (2013.01); *B01D 53/944* (2013.01); *B01D 53/9418* (2013.01);
(Continued)

(58) Field of Classification Search
CPC ............ B01D 53/9418; B01D 53/9436; B01D 53/944; B01D 53/9477; B01D 2255/104; B01D 2255/2092; B01J 23/50; F01N 3/103; F01N 3/108; F01N 3/2033; F01N 3/2066; F01N 3/208; F01N 13/009;
(Continued)

(56) References Cited

U.S. PATENT DOCUMENTS

| 5,546,746 A | * | 8/1996 | Whittenberger | ..... B01J 35/0033 219/202 |
| 6,301,888 B1 | * | 10/2001 | Gray, Jr. | ................ F02M 26/35 123/703 |

(Continued)

OTHER PUBLICATIONS

"Catalysts Positioned Before Turbo Charger in Diesel Engines," Brochure from Emitec, 2 pages, accessed Feb. 10, 2019.
(Continued)

*Primary Examiner* — Audrey B. Walter
*Assistant Examiner* — Dapinder Singh
(74) *Attorney, Agent, or Firm* — Foley & Lardner LLP (57) ABSTRACT

A vehicle system includes a diesel oxidation catalyst. The vehicle system includes a hydrocarbon-selective catalytic reduction unit located downstream of the diesel oxidation catalyst. The hydrocarbon-selective catalytic reduction unit is configured to receive exhaust gas from the diesel oxidation catalyst. The vehicle system includes a turbocharger located downstream of the hydrocarbon-selective catalytic reduction unit. The turbocharger is configured to receive exhaust gas from the hydrocarbon-selective catalytic reduction unit.

14 Claims, 6 Drawing Sheets

(51) Int. Cl.
  *B01D 53/94*  (2006.01)
  *B01J 23/50*  (2006.01)
  *F01N 3/10*   (2006.01)

(52) U.S. Cl.
  CPC ..... *B01D 53/9436* (2013.01); *B01D 53/9477* (2013.01); *B01J 23/50* (2013.01); *F01N 3/106* (2013.01); *F01N 3/2066* (2013.01); *F01N 13/009* (2014.06); *B01D 2255/104* (2013.01); *B01D 2255/2092* (2013.01); *F01N 2610/02* (2013.01); *F01N 2610/1433* (2013.01); *F01N 2610/1453* (2013.01)

(58) Field of Classification Search
  CPC ............. F01N 2340/06; F01N 2610/02; F01N 2610/03; F01N 2610/1433; F01N 2610/1453; F01N 2900/1626; Y02A 50/20; Y02T 10/12; Y02T 10/40
  See application file for complete search history.

(56) References Cited

U.S. PATENT DOCUMENTS

| | | | |
|---|---|---|---|
| 8,312,708 | B2 | 11/2012 | Bennet et al. |
| 8,601,797 | B2 | 12/2013 | Lee |
| 8,904,760 | B2 | 12/2014 | Mital |
| 9,103,255 | B2* | 8/2015 | Hepburn ............... F01N 3/2066 |
| 9,593,614 | B2* | 3/2017 | Osumi .................. F01N 3/0253 |
| 2003/0110761 | A1* | 6/2003 | Minami ............... F01N 13/0093 60/288 |
| 2013/0000277 | A1* | 1/2013 | Uzkan ................. F02D 41/0087 60/297 |
| 2014/0010744 | A1* | 1/2014 | Ruona ..................... F01N 3/208 422/105 |
| 2015/0204226 | A1 | 7/2015 | Moore |
| 2015/0275801 | A1* | 10/2015 | Nagaoka ................... F01N 9/00 60/285 |
| 2016/0166990 | A1 | 6/2016 | Phillips et al. |
| 2017/0051654 | A1* | 2/2017 | Gupta ..................... F01N 3/035 |
| 2017/0159525 | A1 | 6/2017 | Backhaus |
| 2017/0191393 | A1 | 7/2017 | Koshy et al. |
| 2019/0162091 | A1* | 5/2019 | Banno ..................... B01J 23/42 |

OTHER PUBLICATIONS

"Cummins shows off new integrated turbocharger and aftertreatment system," Coach & Bus Week, retrieved from https://cbwmagazine.com/cummins-shows-off-new-integrated-turbocharger-and-aftertreatment-system/, dated Jul. 8, 2018, 4 pages.

International Search Report and Written Opinion issued for PCT Application No. PCT/US2019/044101 dated Oct. 7, 2019, 9 pages.

\* cited by examiner

Dual SCR NOx Product Dependance on $H_2$, 27,000 $h^{-1}$, 8% $O_2$, 4% $CO_2$, 6% $H_2O$, 140ppm $C_3H_8$, 180ppm $NO/NO_2$ (1:1), $C_{12}H_{26}$, C/N=6

FIG. 6

Ag HC-SCR NH₃ and NO product distribution.
300 °C, 27,000 h⁻¹, 8% O₂, 4% CO₂, 6% H₂O, 140ppm
C₃H₈, 200ppm NO/NO₂(1:1)

SYSTEMS AND METHODS FOR DECREASING TIME TO REACH LIGHT-OFF TEMPERATURE

CROSS-REFERENCE TO RELATED APPLICATION

The present application is a National Phase Application of PCT/US2019/044101, filed Jul. 30, 2019, the contents of which are hereby incorporated by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, diesel exhaust fluid (DEF), or aqueous urea, is typically introduced into the exhaust gas flow prior to the catalyst chamber. In some applications, the reduced $NO_x$ emissions do not meet ultra-low $NO_x$ emission regulations.

SUMMARY

Embodiments described herein relate generally to systems and methods for decreasing time to reach light-off temperature. Hydrocarbon injection into a diesel oxidation catalyst (DOC) via post fueling or doser injection can be used as a thermal management device. Hydrocarbon slip from the DOC can be reacted over an HC—SCR. The DOC can convert some NO to $NO_2$. Unconverted $NO_x$ and $NH_3$ slip from the HC—SCR can be used to reduce $NO_x$ with an ammonia SCR close coupled to the turbine outlet.

At least one aspect of the present disclosure is directed to a vehicle system. In some embodiments, the vehicle system includes a diesel oxidation catalyst. The vehicle system includes a hydrocarbon-selective catalytic reduction unit located downstream of the diesel oxidation catalyst. The hydrocarbon-selective catalytic reduction unit is configured to receive exhaust gas from the diesel oxidation catalyst. The vehicle system includes a turbocharger located downstream of the hydrocarbon-selective catalytic reduction unit. The turbocharger is configured to receive exhaust gas from the hydrocarbon-selective catalytic reduction unit.

In some embodiments, the diesel oxidation catalyst is configured such that an average space velocity through the diesel oxidation catalyst is in a range of 100,000 $hr^{-1}$ to 120,000 $hr^{-1}$. In some embodiments, the diesel oxidation catalyst is configured to generate a hydrocarbon slip with a carbon to $NO_x$ ratio of 3 to 6.

In some embodiments, the vehicle system includes an ammonia SCR catalyst located downstream of the turbocharger. The ammonia SCR catalyst is configured to receive exhaust gas from the turbocharger. In some embodiments, the vehicle system includes a decomposition chamber located upstream of the ammonia SCR catalyst. The vehicle system includes a reductant pump. The vehicle system includes a dosing module coupled to the decomposition chamber. The dosing module is configured to receive reductant from the reductant pump.

In some embodiments, the diesel oxidation catalyst is configured to reach a light-off temperature in under 30 seconds. In some embodiments, the hydrocarbon-selective catalytic reduction unit includes silver alumina.

At least one aspect of the present disclosure is directed to a method of using a vehicle system. In some embodiments, the method includes receiving exhaust gas at a diesel oxidation catalyst, and promoting oxidation of at least one of hydrocarbons and carbon monoxide. The method includes receiving exhaust gas output from the diesel oxidation catalyst at a hydrocarbon-selective catalytic reduction unit, and converting hydrocarbons and nitrogen oxide compounds to diatomic nitrogen and ammonia. The method includes receiving exhaust gas output from the hydrocarbon-selective catalytic reduction unit at a turbocharger, and increasing efficiency of an engine of the vehicle system.

In some embodiments, the method includes configuring the diesel oxidation catalyst such that an average space velocity through the diesel oxidation catalyst is in a range of 100,000 $hr^{-1}$ to 120,000 $hr^{-1}$. In some embodiments, the method includes configuring the diesel oxidation catalyst to generate a hydrocarbon slip with a carbon to $NO_x$ ratio of 3 to 6.

In some embodiments, the method includes receiving exhaust gas output from the turbocharger at an ammonia SCR catalyst, and producing diatomic nitrogen. In some embodiments, the method includes locating a decomposition chamber upstream of the ammonia SCR catalyst. The method includes providing a reductant pump. The method includes coupling a dosing module to the decomposition chamber. The method includes configuring the dosing module to receive reductant from the reductant pump.

In some embodiments, the method includes configuring the diesel oxidation catalyst to reach the light-off temperature in under 30 seconds. In some embodiments, the hydrocarbon-selective catalytic reduction unit includes silver alumina.

In some embodiments, the method includes pulsing hydrocarbons into an exhaust manifold to increase hydrocarbon slip and $NO_2$ formation.

In some embodiments, the method includes configuring the diesel oxidation catalyst to partially reform diesel fuel to feed the hydrocarbon-selective catalytic reduction unit with hydrocarbons.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems according to certain embodiments of the invention. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated within an exhaust gas aftertreatment system. This treatment often includes treating (e.g., dosing, etc.) the exhaust gasses with a reductant and an SCR catalyst to convert $NO_x$ emissions to more neutral compounds. In some applications, the catalyst does not become effective until the catalyst reaches the light-off temperature. The light off temperature is the minimum temperature to initiate the catalytic reaction. A catalyst that has a higher-light off temperature or takes longer to reach its light-off temperature may not be as effective at reducing $NO_x$ emissions.

Implementations described herein relate to a vehicle system that includes a diesel oxidation catalyst. Hydrocarbon injection into the diesel oxidation catalyst can be used as a thermal management device. The vehicle system includes a hydrocarbon-selective catalytic reduction unit located downstream of the diesel oxidation catalyst. A hydrocarbon-selective catalytic reduction unit often requires relatively high temperatures for improved conversion, as well as a hydrocarbon/$NO_x$ ratio within a preferred range to operate efficiently. The hydrocarbon-selective catalytic reduction unit is configured to be downstream of and receive exhaust gas from the diesel oxidation catalyst. The diesel oxidation catalyst preferably provides conditions conducive to high conversion rates in the hydrocarbon-selective catalytic reduction unit. The vehicle system includes a turbocharger located downstream of the hydrocarbon-selective catalytic reduction unit. The turbocharger is configured to receive exhaust gas from the hydrocarbon-selective catalytic reduction unit. In a preferred configuration, an ammonia selective catalytic reduction unit can be located downstream of, and close coupled to, the turbocharger. More preferably, unconverted $NO_x$ and $NH_3$ slip from the hydrocarbon-selective catalytic reduction unit could be used to further reduce $NO_x$ with the ammonia selective catalytic reduction unit.

The vehicle system described herein reduces $NO_x$ emissions compared to conventional systems because reducing the light-off temperature or decreasing the time to reach the light-off temperature allows the catalyst to convert $NO_x$ sooner than catalysts of conventional systems. Additionally, the vehicle system described herein can reduce $NO_x$ emissions without the addition of supplemental energy into the exhaust.

II. Overview of Exhaust Gas Aftertreatment System

Figure 1:
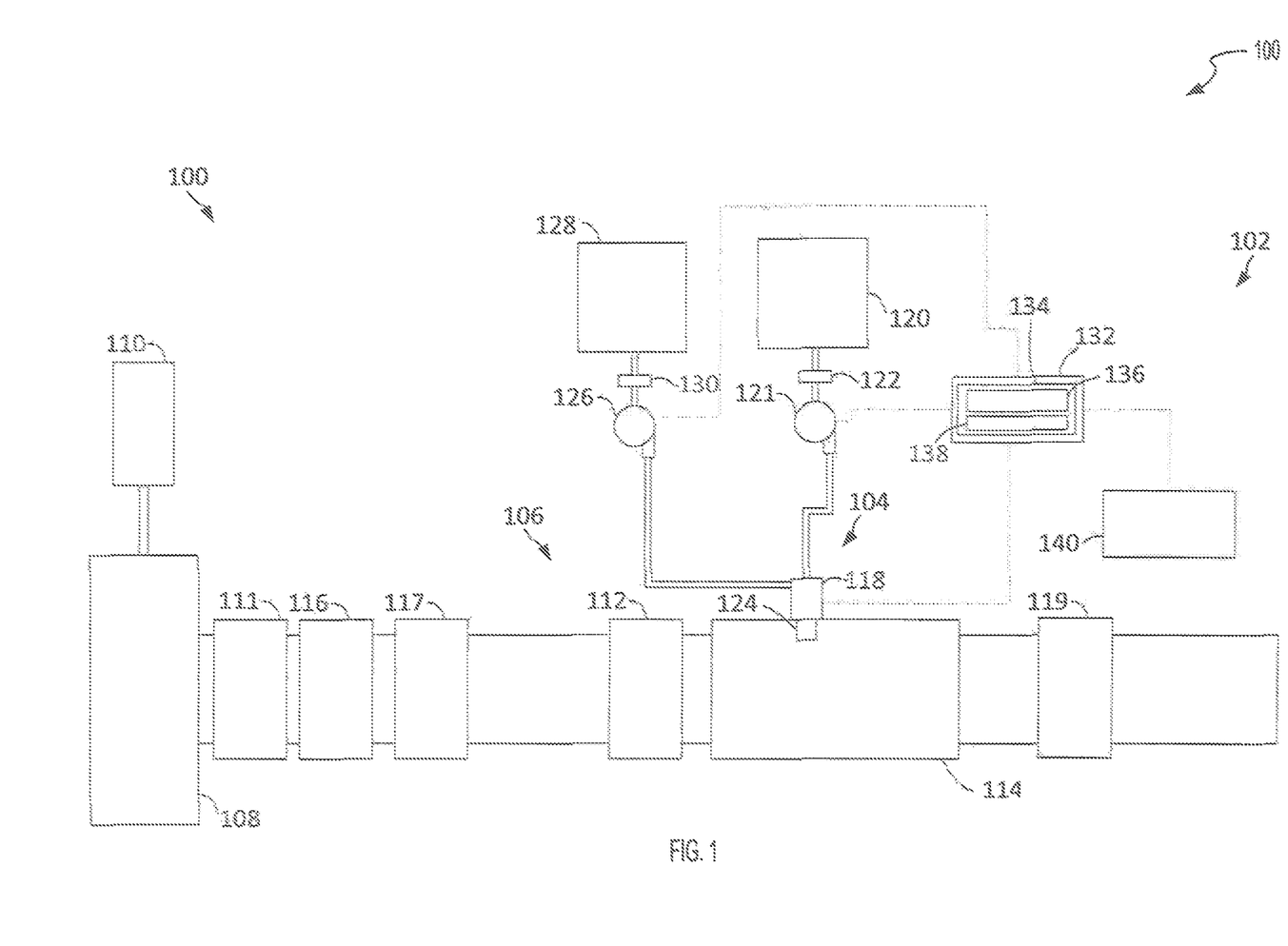
FIG. 1 illustrates a block diagram of an example exhaust gas aftertreatment system having an example reductant delivery system for an exhaust system, according to an embodiment.

FIG. 1 illustrates an example vehicle system 100. The vehicle system 100 includes an internal combustion engine 108, an exhaust gas aftertreatment system 102, and a turbocharger 117. The internal combustion engine 108 (e.g., diesel internal combustion engine, diesel hybrid internal combustion engine, gasoline internal combustion engine, petrol internal combustion engine, liquid propane internal combustion engine, etc.) produces exhaust gas that is received by the exhaust gas aftertreatment system 102 and the turbocharger 117. The internal combustion engine 108 receives fuel (e.g., diesel fuel, gasoline, liquid propane, etc.) from a fuel tank 110. The turbocharger 117 and certain elements of the exhaust gas aftertreatment system 102 (discussed in more detail below) are located along an exhaust gas conduit 106 that receives exhaust gas from the internal combustion engine 108.

The exhaust gas aftertreatment system 102 includes an oxidation catalyst 111 (e.g., a diesel oxidation catalyst (DOC)). The oxidation catalyst 111 is configured to promote oxidation of hydrocarbons and/or carbon monoxide in exhaust gas produced by the internal combustion engine 108 and flowing in the exhaust gas conduit 106.

The exhaust gas aftertreatment system 102 also includes a hydrocarbon-selective catalytic reduction (HC—SCR) unit 116. The HC—SCR unit 116 is configured to assist in the reduction of $NO_x$ emissions by converting hydrocarbons and $NO_x$ into diatomic nitrogen and ammonia. The HC—SCR unit 116 is located downstream of the oxidation catalyst 111. The HC—SCR unit 116 is configured to receive exhaust gas from the oxidation catalyst 111. In some embodiments, the HC—SCR unit 116 includes silver alumina.

The exhaust gas aftertreatment system 102 also includes a particulate filter 112 (e.g., a diesel particulate filter (DPF), etc.). The particulate filter 112 is configured to remove particulate matter, such as soot, from the exhaust gas provided by the oxidation catalyst 111. The particulate filter 112 includes an inlet, where the exhaust gas is received, and an outlet, where the exhaust gas exits after having particulate matter substantially filtered from the exhaust gas and/or converting the particulate matter into carbon dioxide. In some implementations, the particulate filter 112 may be omitted. In some embodiments, a diesel oxidation catalyst is located upstream of the particulate filter 112 and downstream of the turbocharger 117. The diesel oxidation catalyst can convert some NO to $NO_2$ for high box conversion of the HC—SCR unit 116. The diesel oxidation catalyst can promote oxidation of any unconverted hydrocarbons.

The exhaust gas aftertreatment system 102 also includes a decomposition chamber 114 (e.g., reactor, reactor pipe, etc.). The decomposition chamber 114 is configured to convert a reductant into ammonia. The reductant may be, for example, urea, diesel exhaust fluid (DEF), Adblue®, a urea water solution (UWS), an aqueous urea solution (AUS) (e.g., AUS32, etc.), and other similar fluids. The decomposition chamber 114 includes an inlet in fluid communication with the particulate filter 112 to receive the exhaust gas containing $NO_x$ emissions and an outlet for the exhaust gas, $NO_x$ emissions, ammonia, and/or reductant to flow from the decomposition chamber 114.

The decomposition chamber 114 is located downstream of the HC—SCR unit 116. The decomposition chamber 114 is located downstream of the oxidation catalyst 111. The reductant droplets undergo the processes of evaporation, thermolysis, and hydrolysis to form non-$NO_x$ emissions (e.g., gaseous ammonia, etc.) within the exhaust gas conduit 106.

The exhaust gas aftertreatment system 102 includes a reductant delivery system 104. The reductant delivery system 104 includes a dosing module 118 (e.g., doser, etc.) configured to dose the reductant into the decomposition chamber 114 (e.g., via an injector, etc.). The dosing module 118 is mounted to the decomposition chamber 114 such that the dosing module 118 may dose the reductant into the exhaust gas flowing in the exhaust gas conduit 106. The dosing module 118 may include an insulator (e.g., thermal insulator, etc.) and/or isolator (e.g., vibrational isolator, etc.) interposed between a portion of the dosing module 118 and the portion of the decomposition chamber 114 on which the dosing module 118 is mounted.

The dosing module 118 is fluidly coupled to (e.g., fluidly configured to communicate with, etc.) a reductant source 120 (e.g., reductant tank, reductant reservoir, etc.). The reductant source 120 may include multiple reductant sources 120. The reductant source 120 may be, for example, a DEF tank containing Adblue®. A reductant pump 121 (e.g., supply unit, etc.) is used to pressurize the reductant from the reductant source 120 for delivery to the dosing module 118. In some embodiments, the reductant pump 121 is pressure controlled (e.g., controlled to obtain a target pressure, etc.). The reductant pump 121 may draw the reductant through a reductant filter 122. The reductant filter 122 filters (e.g., strains, etc.) the reductant prior to the reductant being provided to internal components (e.g., pistons, vanes, etc.) of the reductant pump 121. For example, the reductant filter 122 may inhibit or prevent the transmission of solids (e.g., solidified reductant, contaminants, etc.) to the internal components of the reductant pump 121. In this way, the reductant filter 122 may facilitate prolonged desirable operation of the reductant pump 121. In some embodiments, the reductant pump 121 is coupled to a chassis of a vehicle associated with the exhaust gas aftertreatment system 102.

The dosing module 118 includes at least one injector 124 (e.g., reductant injector, etc.). Each injector 124 is configured to dose the reductant into the exhaust gas (e.g., within the decomposition chamber 114, etc.). The injector 124 may be positioned to cause the reductant to achieve a target uniformity index (UI) within the exhaust gas at a target location.

In some embodiments, the reductant delivery system 104 also includes an air pump 126. In these embodiments, the air pump 126 draws air from an air source 128 (e.g., air intake, atmosphere, etc.) and through an air filter 130 disposed upstream of the air pump 126. The air filter 130 filters the air prior to the air being provided to internal components (e.g., pistons, vanes, etc.) of the air pump 126. For example, the air filter 130 may inhibit or prevent the transmission of solids (e.g., debris, branches, dirt, etc.) to the internal components of the air pump 126. In this way, the air filter 130 may facilitate prolonged desirable operation of the air pump 126. The air pump 126 provides the air to the dosing module 118 via a conduit. The dosing module 118 is configured to mix the air and the reductant into an air-reductant mixture and to provide the air-reductant mixture into the decomposition chamber 114. In other embodiments, the reductant delivery system 104 does not include the air pump 126 or the air source 128. In such embodiments, the dosing module 118 is not configured to mix the reductant with air.

The dosing module 118 and the reductant pump 121 are also electrically or communicatively coupled to an exhaust gas aftertreatment system controller 132. The exhaust gas aftertreatment system controller 132 is configured to control the dosing module 118 to dose the reductant into the decomposition chamber 114. The exhaust gas aftertreatment system controller 132 may also be configured to control the reductant pump 121.

The exhaust gas aftertreatment system controller 132 includes a processing circuit 134. The processing circuit 134 includes a processor 136 and a memory 138. The processor 136 may include a microprocessor, an application-specific integrated circuit (ASIC), a field-programmable gate array (FPGA), etc., or combinations thereof. The memory 138 may include, but is not limited to, electronic, optical, magnetic, or any other storage or transmission device capable of providing a processor, ASIC, FPGA, etc. with program instructions. This memory 138 may include a memory chip, Electrically Erasable Programmable Read-Only Memory (EEPROM), Erasable Programmable Read Only Memory (EPROM), flash memory, or any other suitable memory from which the exhaust gas aftertreatment system controller 132 can read instructions. The instructions may include code from any suitable programming language. The memory 138 may include various modules that include instructions which are configured to be implemented by the processor 136.

In various embodiments, the exhaust gas aftertreatment system controller 132 is electrically or communicatively coupled to a central controller 140 (e.g., engine control unit (ECU)), engine control module (ECM), etc.) of an internal combustion engine having the exhaust gas aftertreatment system 102. In some embodiments, the central controller 140 and the exhaust gas aftertreatment system controller 132 are integrated into a single controller.

In some embodiments, the central controller 140 is communicable with a display device (e.g., screen, monitor, touch screen, heads up display (HUD), indicator light, etc.). The display device may be configured to change state in response to receiving information from the central controller 140. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 140. By changing state, the display device may provide an indication to a user (e.g., operator, etc.) of a status (e.g., operation, in need of service, etc.) of the reductant delivery system 104.

While not shown, it is understood that the internal combustion engine 108 includes various components, such as cylinders, pistons, fuel injectors, air intakes, and other similar components. In some applications, the internal combustion engine 108 may include an exhaust gas recirculation (EGR) system, a waste heat recovery (WHR) system, and/or other similar components.

The vehicle system 100 includes a turbocharger 117. The turbocharger 117 is located downstream of the HC—SCR unit 116. The turbocharger 117 is configured to receive exhaust gas from the HC—SCR unit 116. The turbocharger 117 increases efficiency of the engine 108 of the vehicle system 100.

In some embodiments, the particulate filter 112 may be positioned downstream of the decomposition chamber 114. For instance, the particulate filter 112 and the HC—SCR unit 116 may be combined into a single unit. In some implementations, the dosing module 118 may instead be positioned downstream of the turbocharger 117 or upstream of the turbocharger 117.

In some embodiments, the vehicle system 100 includes an ammonia SCR catalyst 119. The ammonia SCR catalyst 119 is located downstream of, and preferably close coupled to, the turbocharger 117. The ammonia SCR catalyst 119 is configured to receive exhaust gas from the turbocharger 117. In such embodiments, the vehicle system 100 optionally includes the decomposition chamber 114 located upstream of the ammonia SCR catalyst 119. In some embodiments, the ammonia SCR catalyst 119 is located upstream of the turbocharger 117.

III. Example Systems Showing Turbocharger Related Components

Figure 2:
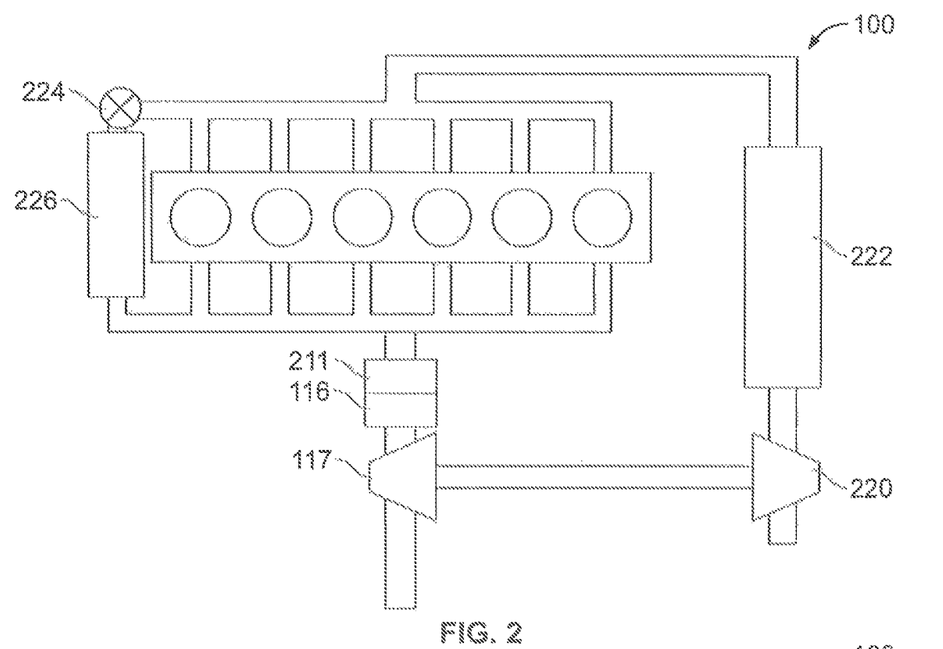
FIG. 2 illustrates a block diagram of an example exhaust gas aftertreatment system, according to an embodiment.

FIG. 2 illustrates an example vehicle system 100. In this embodiment, the vehicle system 100 includes a diesel oxidation catalyst 211 (a preferred configuration of the oxidation catalyst 111), the HC—SCR unit 116, and the turbocharger 117. The HC—SCR unit 116 is located downstream of the diesel oxidation catalyst 211 and is configured to receive exhaust gas from the diesel oxidation catalyst 211. The turbocharger 117 is located downstream of the HC—SCR unit 116 and is configured to receive exhaust gas from the HC—SCR unit 116.

The vehicle system 100 includes turbocharger related components, including a compressor 220, an intercooler 222, an exhaust gas recirculation (EGR) valve 224, and an EGR cooler 226. The compressor 220 draws in air and compresses the air. The intercooler 222 cools the compressed air from the compressor 220. The EGR valve 224 redirects exhaust gas into the intake manifold of the engine 108. The EGR cooler 226 lowers the temperature of the exhaust gases through the exhaust gas recirculation system.

Figure 3:
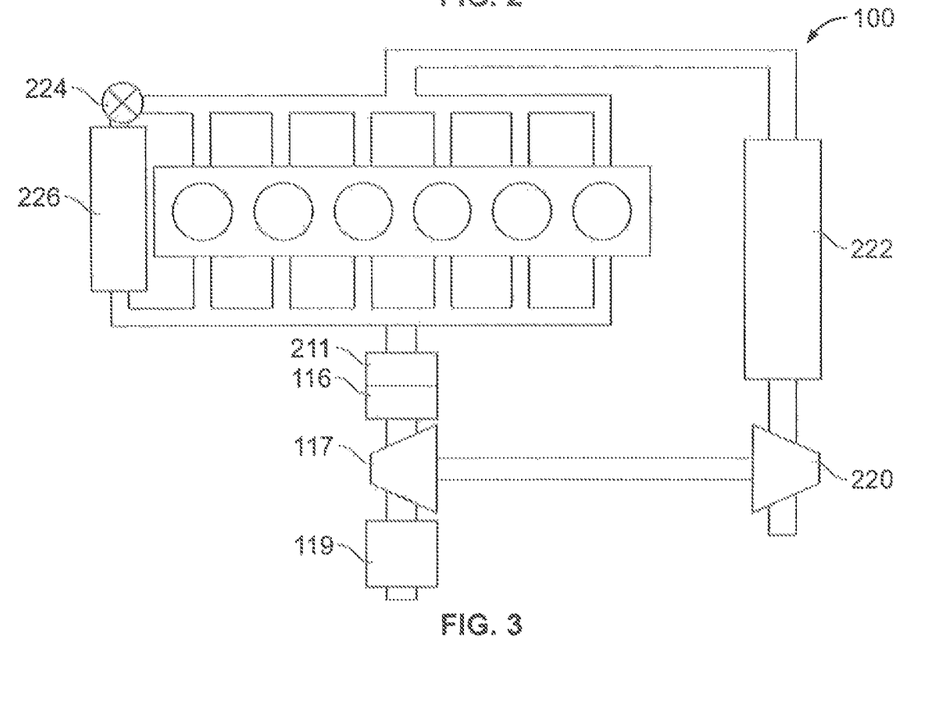
FIG. 3 illustrates a block diagram of an example exhaust gas aftertreatment system, according to an embodiment.

FIG. 3 illustrates another example vehicle system 100. The vehicle system 100 includes the diesel oxidation catalyst 211, the HC—SCR unit 116, the turbocharger 117, and the ammonia SCR catalyst 119. The HC—SCR unit 116 is located downstream of the diesel oxidation catalyst 211 and is configured to receive exhaust gas from the diesel oxidation catalyst 211. The turbocharger 117 is located downstream of the HC—SCR unit 116 and is configured to receive exhaust gas from the HC—SCR unit 116. The ammonia SCR catalyst 119 is located downstream of the turbocharger 117 and is configured to receive exhaust gas from the turbocharger 117.

IV. Example System for Decreasing Time to Reach Light-Off Temperature

In the example systems described above, and other systems within the scope of this disclosure, the diesel oxidation catalyst 111 or 211 is located upstream of the turbocharger 117, which can allow for the rapid cold start warm-up of the oxidation catalysts without the use of supplemental energy (e.g., an external heater or mini-burner).

Figure 4:
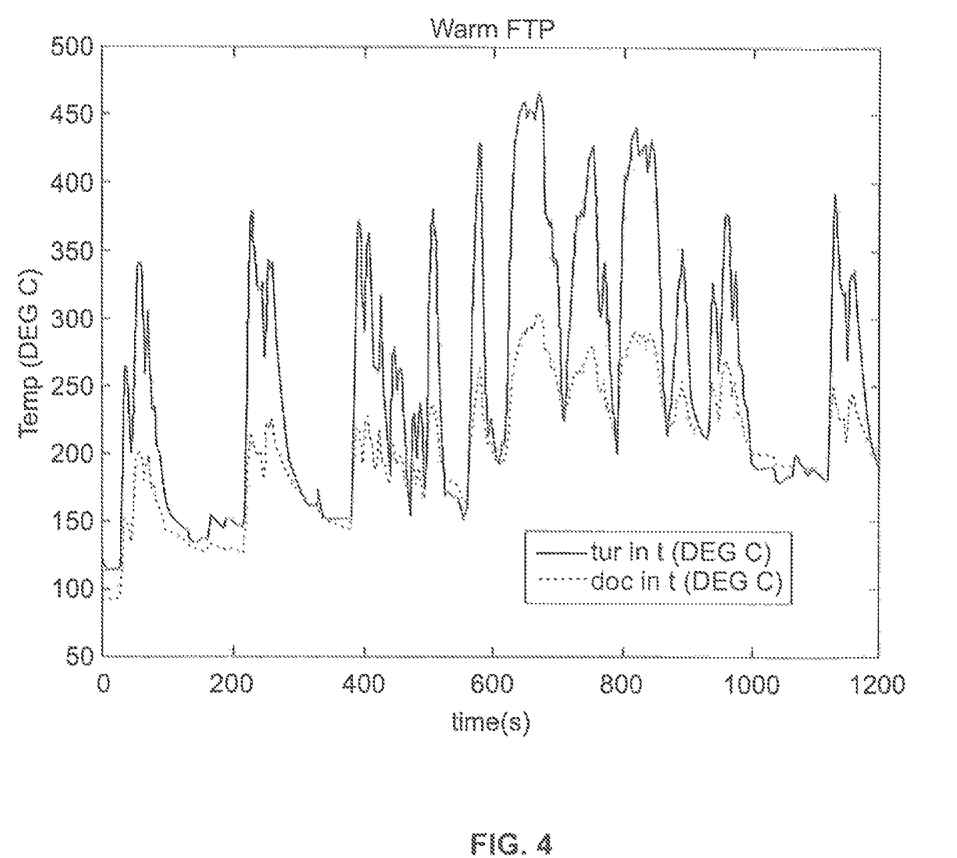
FIGS. 4 and 5 illustrate plots of gas temperature at a turbo inlet and a DOC inlet (for a DOC conventionally located downstream of the turbocharger) during a federal test procedure (FTP) warm start and cold start, respectively.
Figure 5:
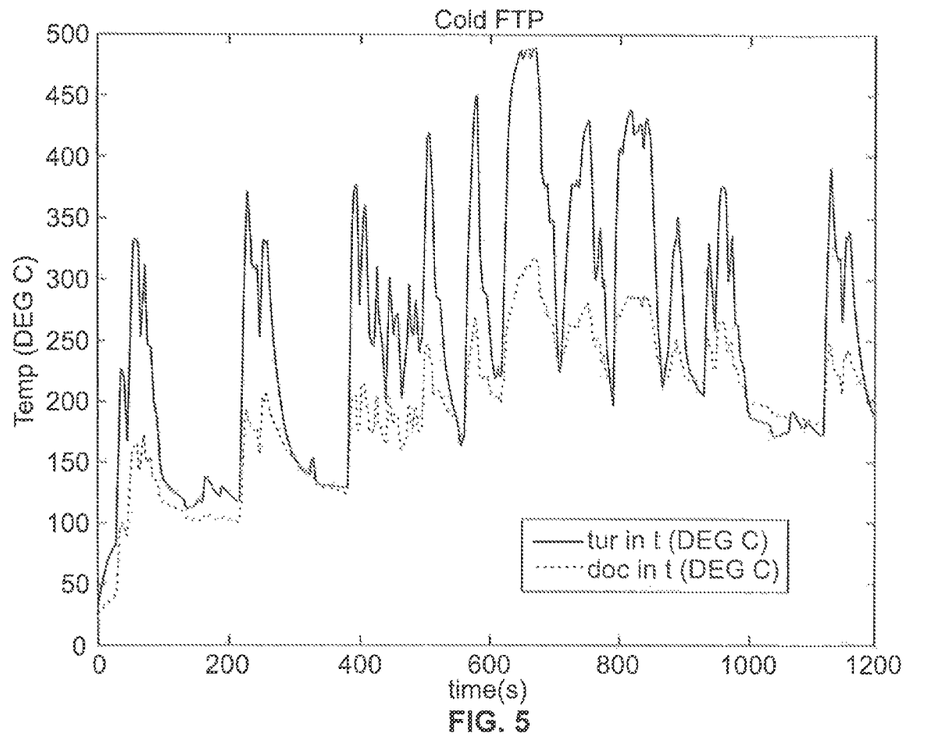

Gas at the inlet of the turbocharger typically will be hotter (e.g., 50° C.-150° C. hotter) than at the outlet of the turbocharger over a federal test protocol (FTP). For example, FIGS. 4 and 5 illustrate plots of gas temperature at a turbo inlet and a DOC inlet (for a DOC conventionally located downstream of the turbocharger) during a federal test procedure (FTP) warm start and cold start, respectively. The data is obtained from a Cummins® 400 hp 2017×15 Efficiency engine. The plots show that gas temperature at the turbocharger inlet typically will be hotter (e.g., 50° C.-150° C. hotter) than the turbocharger outlet over both an FTP warm start and cold start for the Cummins® 400 hp 2017×15 Efficiency engine.

The higher temperatures of gas at or upstream of the turbocharger inlet can allow for significant improvements in the time to light-off an oxidation catalyst, because temperatures are suitable for NO and HC conversion at earlier times in the emissions cycle. For example, cold start FTP NOx conversion typically takes nearly 600 seconds to begin due to the time necessary to heat up catalyst bricks and to achieve a suitable temperature for DEF introduction and SCR activity. Locating the DOC 111 upstream of the turbocharger 117 can allow for significant $NO_x$ conversion in less than 200 seconds. The increase in temperatures prior to the turbocharger 117 may allow for HC light-off as soon as 30 seconds into a cold FTP.

The HC SCR 116 often requires relatively high temperatures for improved conversion, as well as a hydrocarbon/NOx ratio within a preferred range to operate efficiently. The HC SCR 116 is preferably located downstream of and receives exhaust gas from the DOC 111. The DOC 111 preferably provides conditions conducive to high conversion rates in the HC SCR 116. In some embodiments, the DOC is configured such that an average space velocity through the DOC is in a range of 100,000 $hr^{-1}$ to 120,000 $hr^{-1}$. The DOC can be integrated into the exhaust manifold. Hydrocarbon slip from the DOC can be used as a thermal management device that would allow for high conversion rates of $NO_x$ to more neutral compounds in a HC—SCR unit 116. The DOC can convert some NO to $NO_2$.

Figure 6:
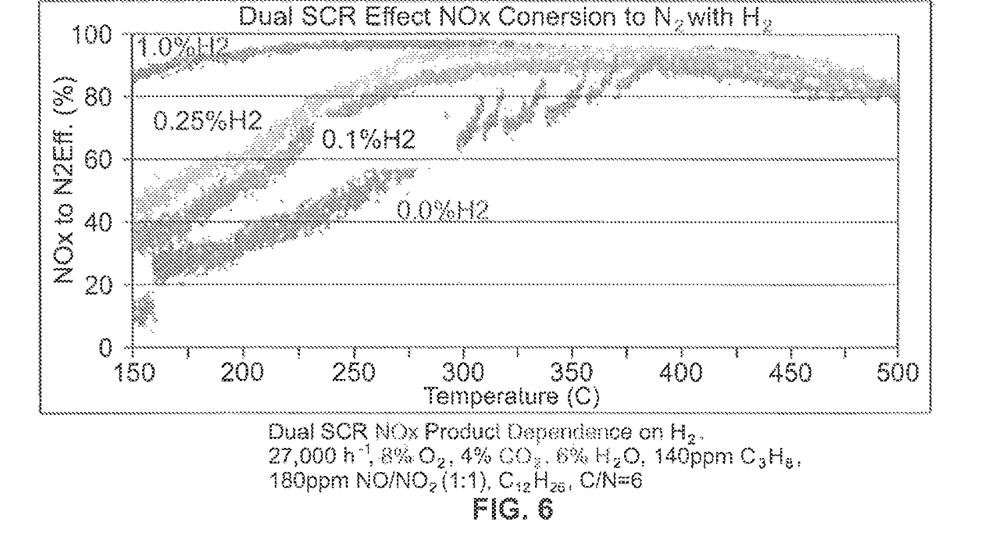
FIG. 6 illustrates a plot of hydrocarbon-selective catalytic reduction conversion efficiency vs. temperature, according to an embodiment.

FIG. 6 illustrates a plot of hydrocarbon-selective catalytic reduction conversion efficiency vs. temperature, according to an embodiment. The plot shows the HC—SCR conversion efficiency vs. temperature with various amount of $H_2$ added. The plot shows that $NO_x$ conversion efficiency generally increases with higher temperatures. Additionally, the plot shows that $NO_x$ conversion efficiency is higher for higher concentrations of $H_2$. For example, the $NO_x$ conversion efficiency of $NO_x$ to $N_2$ with 1.0% $H_2$ is higher than the $NO_x$ conversion efficiency of $NO_x$ to $N_2$ with 0.25% $H_2$, 0.1% $H_2$, or 0.0% $H_2$. The $NO_x$ conversion efficiency of $NO_x$ to $N_2$ with 0.25% $H_2$ is higher than the $NO_x$ conversion efficiency of $NO_x$ to $N_2$ with 0.1% $H_2$ or 0.0% $H_2$. The $NO_x$ conversion efficiency of $NO_x$ to $N_2$ with 0.1% $H_2$ is higher than the $NO_x$ conversion efficiency of $NO_x$ to $N_2$ with 0.0% $H_2$. In some embodiments, the DOC can be sized to promote some hydrocarbon slip after light-off. Hydrocarbon slip, which occurs when hydrocarbons pass through the DOC without being catalyzed, can be used to promote an increase in the $NO_x$ conversion efficiency, as illustrated by the plot. By locating the HC—SCR downstream of the DOC, the HC—SCR can use the hydrocarbon slip from the DOC to convert $NO_x$ to nitrogen and ammonia. For exhaust gas without $H_2$, conversion of hydrocarbons into nitrogen and ammonia is highly temperature dependent for temperatures below 350° C. The location of the HC—SCR allows for high conversion rates without $H_2$ because the hydrocarbons reacting over the DOC increases the temperature to a range for high conversion. The temperatures downstream of the DOC can be greater than 350° C. In some embodiments, the diesel oxidation catalyst is configured to generate a hydrocarbon slip with a carbon to $NO_x$ ratio of 3 to 6. The hydrocarbon slip from the DOC can be used as a thermal management device to allow for conditions conducive to high conversion rates in the HC—SCR unit 116. The HC—SCR unit 116 can be located downstream of the DOC to convert hydrocarbons and $NO_x$ to nitrogen and ammonia. For example, the HC—SCR unit 116 can convert the remaining hydrocarbons and 70% of the $NO_x$ to nitrogen and ammonia. The plot shows a dual SCR $NO_x$ product dependence on $H_2$. A dual SCR can include a HC—SCR unit 116 and an ammonia SCR catalyst 119.

Figure 7A:
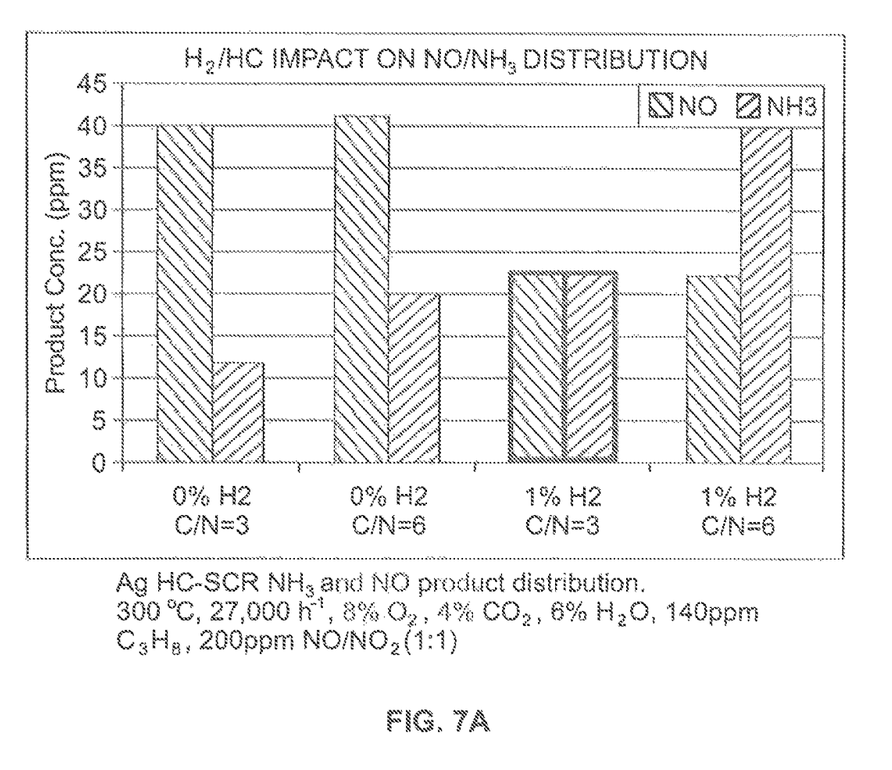
FIG. 7A illustrates a plot of carbon to $NO_x$ ratio impact on outlet ammonia to $NO_x$ ratio for a silver alumina HC—SCR, according to an embodiment.

FIG. 7A illustrates a plot of carbon to $NO_x$ ratio impact on outlet ammonia to $NO_x$ ratio for a silver alumina HC—SCR. Different ammonia to $NO_x$ ratios (ANR) can have an effect on the amount of $NO_x$ reduced by the exhaust gas aftertreatment system. For example, achieving an ANR of 0.5 at the inlet of the SCR may result in reducing up to another half of the remaining $NO_x$ downstream of the turbocharger. The plot of carbon to $NO_x$ ratio impact on outlet ANR shows that a concentration of 1% $H_2$ and a carbon to $NO_x$ ratio of 6 can result in in an ANR of 2. A concentration of 1% $H_2$ and a carbon to $NO_x$ ratio of 3 can result in in an ANR of 1. A concentration of 0% $H_2$ and a carbon to $NO_x$ ratio of 6 can result in in an ANR of 0.5. A concentration of 0% $H_2$ and a carbon to $NO_x$ ratio of 3 can result in in an ANR of 0.3. The plot shows that by varying the $H_2$ concentration and the carbon to $NO_x$ ratio, the ANR can be tuned to promote $NO_x$ conversion. An ammonia SCR catalyst 119 can be located at the turbine outlet. The ammonia SCR catalyst 119 can be coupled to the turbine outlet. The turbine outlet can include a turbocharger outlet. The turbocharger outlet can reduce temperatures to be suitable for ammonia SCR catalyst 119 activity. The turbocharger outlet can reduce the pre-turbine catalyst volume. The ammonia SCR catalyst 119 placed near the turbine outlet can reduce the NOR downstream of the turbocharger.

Figure 7B:
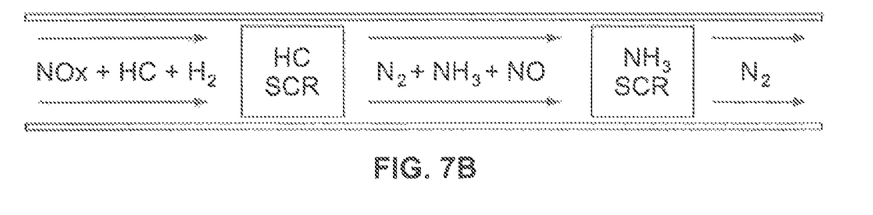
FIG. 7B illustrates a block diagram of a dual SCR, according to an embodiment.

FIG. 7B illustrates a block diagram of a dual SCR, according to an embodiment. Hydrocarbon slip from the DOC can be used to promote an increase in the NOR conversion efficiency. NOR, hydrocarbons, and $H_2$ can enter and flow through the HC—SCR unit 116. $N_2$, $NH_3$, and NO can flow out of the HC—SCR unit 116. $N_2$, $NH_3$, and NO can enter and flow through the ammonia SCR. $N_2$ can flow out of the ammonia SCR. Unconverted NOR and $NH_3$ slip from the HC—SCR unit 116 can be used to reduce NOR with an ammonia SCR close coupled to the turbine outlet. The HC—SCR unit 116 located downstream of the DOC can allow for the conversion of hydrocarbons and $H_2$ to nitrogen and ammonia. The ammonia SCR located downstream of the HC—SCR unit 116 can allow for the conversion of ammonia and NO to $N_2$. An ammonia to NOR ratio of 0.5 can promote the conversion of ammonia and NO to $N_2$, thereby reducing the amount of unconverted NOR.

V. Example Method for Decreasing Time to Reach Light-Off Temperature

Figure 8:
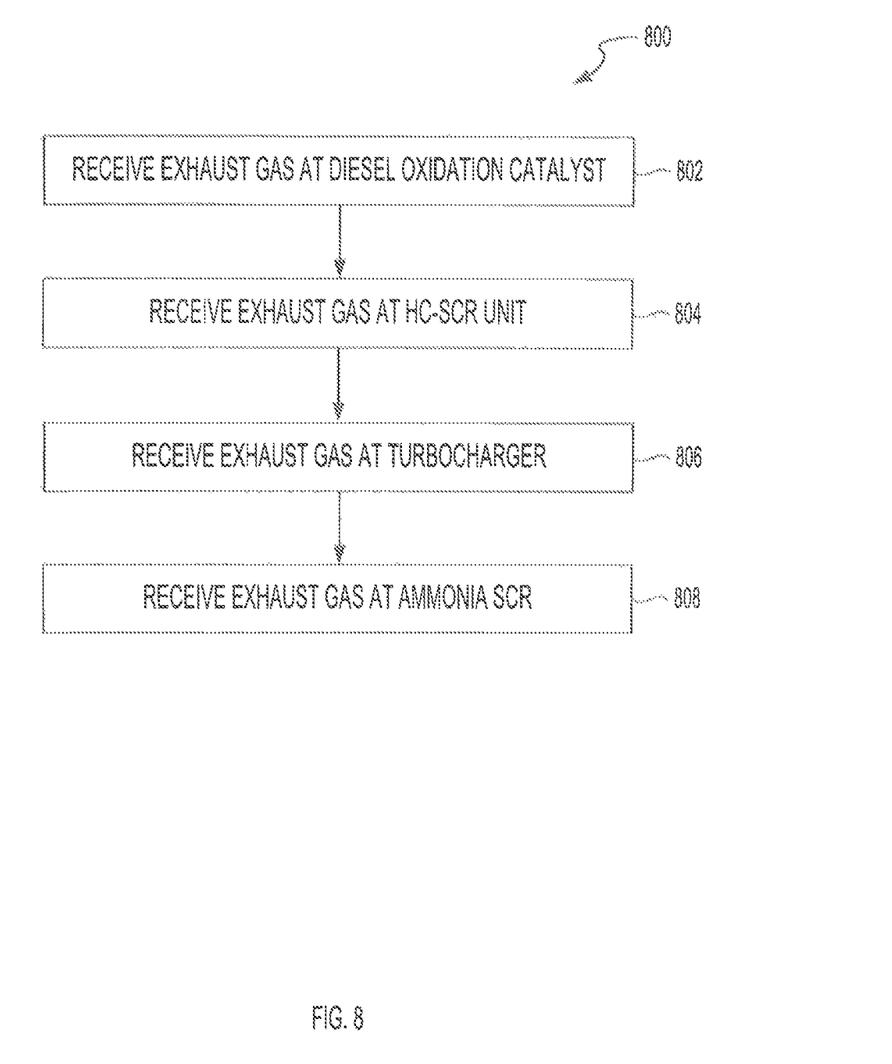
FIG. 8 illustrates a method for decreasing time to reach light-off temperature, according to an embodiment.

FIG. 8 illustrates a method of using a vehicle system. In brief summary, the method 800 includes receiving exhaust gas at a diesel oxidation catalyst (BLOCK 802), subsequently receiving exhaust gas output at a HC—SCR unit (BLOCK 804), and then receiving exhaust gas at a turbocharger (BLOCK 806). The method 800 also may include receiving exhaust gas at an ammonia SCR catalyst (BLOCK 808).

The method 800 includes receiving exhaust gas at a diesel oxidation catalyst (BLOCK 802). The diesel oxidation catalyst promotes oxidation of at least one of hydrocarbons and carbon monoxide. In some embodiments, the method can include configuring the diesel oxidation catalyst such that an average space velocity through the diesel oxidation catalyst is in the range of 100,000 $hr^{-1}$ to 120,000 $hr^{-1}$. In some embodiments, the method can include configuring the diesel oxidation catalyst to generate a hydrocarbon slip with a carbon to NOR ratio of 3 to 6. In some embodiments, the method can include configuring the diesel oxidation catalyst to reach the light-off temperature in under 30 seconds. Receiving exhaust gas at the diesel oxidation catalyst before the exhaust gas reaches the turbocharger can allow the diesel oxidation catalyst to act as a thermal management device. Receiving exhaust gas at the diesel oxidation catalyst before the exhaust gas reaches the turbocharger can allow the diesel oxidation catalyst to reach light-off temperature more quickly than if the diesel oxidation catalyst were located downstream of the turbocharger. The diesel oxidation catalyst can oxidize hydrocarbons and allow for rapid heating of the exhaust gas aftertreatment system located downstream from the diesel oxidation catalyst. In some embodiments, the method includes pulsing hydrocarbons into an exhaust manifold to increase hydrocarbon slip and $NO_2$ formation. The diesel oxidation catalyst can result in increased hydrocarbon slip and $NO_2$ formation through pulsed hydrocarbon introduction into the exhaust manifold. In some embodiments, the method includes configuring the diesel oxidation catalyst to partially reform diesel fuel to feed the hydrocarbon-selective catalytic reduction unit with hydrocarbons. Partially reforming the diesel fuel to feed the HC—SCR until with hydrocarbons can result in increased conversion efficiency.

The method 800 includes receiving exhaust gas output at a HC—SCR unit (BLOCK 804). The method 800 includes receiving exhaust gas output from the diesel oxidation catalyst at a HC—SCR unit. The HC—SCR unit converts hydrocarbons and nitrogen oxide compounds to diatomic nitrogen and ammonia. The HC—SCR unit can include silver alumina. Receiving the exhaust gas output at the HC—SCR unit before the exhaust as reaches the turbocharger can allow the HC—SCR unit to reach light-off temperature more quickly than if the HC—SCR unit were located downstream of the turbocharger. The HC—SCR unit can be located downstream from the diesel oxidation catalyst to convert nitrogen oxide and hydrocarbons that the diesel oxidation catalyst does not oxidize to diatomic nitrogen and ammonia.

The method 800 includes receiving exhaust gas at a turbocharger (BLOCK 806). The method 800 includes receiving exhaust gas output from the HC—SCR unit at a turbocharger. The turbocharger increases efficiency of an engine of the vehicle system. The turbocharger can be located downstream from the diesel oxidation catalyst and the HC—SCR unit. Locating the turbocharger downstream from the diesel oxidation catalyst and the HC—SCR unit allows the diesel oxidation catalyst and HC—SCR unit to reach light-off temperatures more quickly than if the turbocharger were located upstream from the diesel oxidation catalyst and HC—SCR unit.

The method 800 can include receiving exhaust gas at an ammonia SCR catalyst (BLOCK 808). The method 800 includes receiving exhaust gas output from the turbocharger at an ammonia SCR catalyst. The ammonia SCR catalyst produces diatomic nitrogen. In some embodiments, the method 800 can include locating a decomposition chamber upstream of the ammonia SCR catalyst. The method 800 can include providing a reductant pump. The method 800 can include coupling a dosing module to the decomposition chamber. The method 800 can include configuring the dosing module to receive reductant from the reductant pump. The ammonia SCR catalyst can be located near the turbine outlet. The turbocharger outlet can be at a temperature suitable for ammonia SCR activity.

VI. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid (e.g., exhaust, water, air, gaseous reductant, gaseous ammonia, etc.) may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. A vehicle system, comprising:
    a diesel oxidation catalyst configured to generate a hydrocarbon slip with a carbon to $NO_x$ ratio of 3 to 6;
    a hydrocarbon-selective catalytic reduction unit located downstream of the diesel oxidation catalyst and configured to receive exhaust gas from the diesel oxidation catalyst; and
    a turbocharger located downstream of the hydrocarbon-selective catalytic reduction unit and configured to receive exhaust gas from the hydrocarbon-selective catalytic reduction unit.

2. The vehicle system of claim 1, wherein the diesel oxidation catalyst is configured such that an average space velocity through the diesel oxidation catalyst is in a range of 100,000 $hr^{-1}$ to 120,000 $hr^{-1}$.

3. The vehicle system of claim 1, further comprising:
    an ammonia SCR catalyst located downstream of the turbocharger and configured to receive exhaust gas from the turbocharger.

4. The vehicle system of claim 3 further comprising:
    a decomposition chamber located upstream of the ammonia SCR catalyst;
    a reductant pump; and
    a dosing module coupled to the decomposition chamber and configured to receive reductant from the reductant pump.

5. The vehicle system of claim 1, wherein:
    the diesel oxidation catalyst is configured to reach a light-off temperature in under 30 seconds.

6. The vehicle system of claim 1, wherein the hydrocarbon-selective catalytic reduction unit comprises silver alumina.

7. A method of using a vehicle system, comprising:
    receiving exhaust gas at a diesel oxidation catalyst to promote oxidation of at least one of hydrocarbons and carbon monoxide;
    causing the diesel oxidation catalyst to generate a hydrocarbon slip with a carbon to $NO_x$ ratio of 3 to 6;
    receiving exhaust gas output from the diesel oxidation catalyst at a hydrocarbon-selective catalytic reduction unit to convert hydrocarbons and nitrogen oxide compounds to diatomic nitrogen and ammonia; and
    receiving exhaust gas output from the hydrocarbon-selective catalytic reduction unit at a turbocharger.

8. The method of claim 7, comprising:
    configuring the diesel oxidation catalyst such that an average space velocity through the diesel oxidation catalyst is in a range of 100,000 $hr^{-1}$ to 120,000 $hr^{-1}$.

9. The method of claim 7, comprising:
    receiving exhaust gas output from the turbocharger at an ammonia SCR catalyst, and producing diatomic nitrogen.

10. The method of claim 9, comprising:
    locating a decomposition chamber upstream of the ammonia SCR catalyst;
    providing a reductant pump; and
    coupling a dosing module to the decomposition chamber;
    configuring the dosing module to receive reductant from the reductant pump.

11. The method of claim 7, comprising:
configuring the diesel oxidation catalyst to reach the light-off temperature in under 30 seconds.

12. The method of claim 7, wherein the hydrocarbon-selective catalytic reduction unit comprises silver alumina.

13. The method of claim 7, comprising:
pulsing hydrocarbons into an exhaust manifold to increase hydrocarbon slip and $NO_2$ formation.

14. The method of claim 7, comprising:
configuring the diesel oxidation catalyst to partially reform diesel fuel to feed the hydrocarbon-selective catalytic reduction unit with hydrocarbons.

* * * * *